Nov. 24, 1942.   J. L. HAMILTON   2,302,948
LUBRICATED BEARING
Filed Aug. 4, 1940   3 Sheets-Sheet 1

INVENTOR:
JAMES L. HAMILTON
BY
Roy M. Eilers
ATTORNEYS.

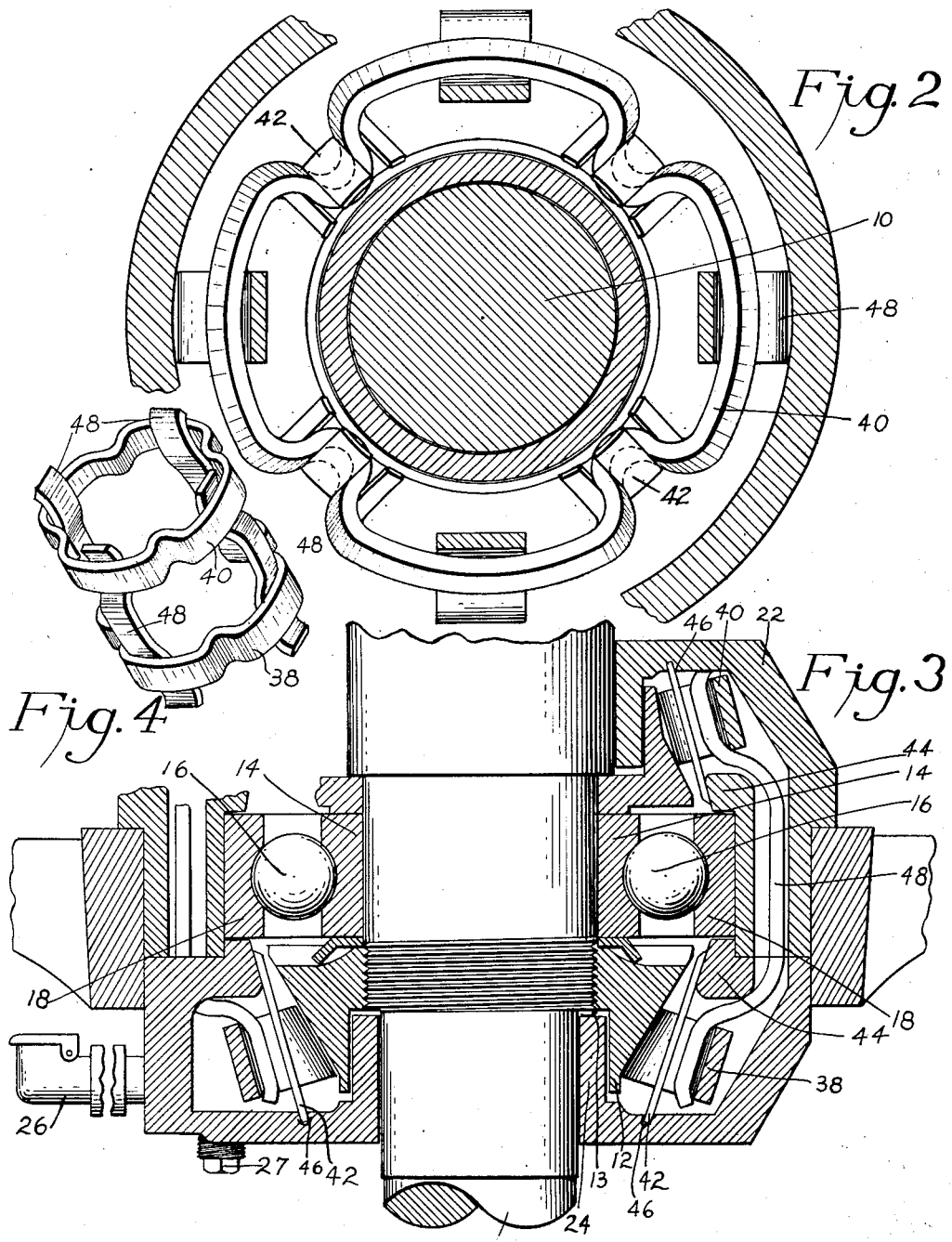

Nov. 24, 1942.　　J. L. HAMILTON　　2,302,948
LUBRICATED BEARING
Filed Aug. 4, 1940　　3 Sheets-Sheet 3

INVENTOR
JAMES. L. HAMILTON
BY
Roy M Eilers
ATTORNEY

Patented Nov. 24, 1942

2,302,948

UNITED STATES PATENT OFFICE 2,302,948

LUBRICATED BEARING

James L. Hamilton, Kirkwood, Mo., assignor to Century Electric Company, St. Louis, Mo., a corporation of Missouri Application August 4, 1940, Serial No. 351,321

4 Claims. (Cl. 308—187)

This invention relates to improvements in lubricated bearings. More particularly, the invention relates to improvements in lubricated bearings that may be prepared for efficient operation on vertical or horizontal shafts by a slight change in the position of the parts thereof.

It is an object of the invention to provide a simple and efficient lubricated bearing which may be prepared for efficient operation on vertical or horizontal shafts by a slight change in the position of the parts thereof.

In the past, bearings have been used interchangeably on vertical and horizontal shafts, but these bearings did not operate efficiently because the oiling systems used therein were operable only in the vertical or the horizontal position. Because of the inability of the oiling systems of such bearings to operate in both a vertical and horizontal position, an insufficient supply of oil was furnished to the bearing surfaces of those bearings that were operated in positions other than the position for which the oiling system was designed. The insufficient supply of oil resulted in inefficient operation of the bearing which usually was climaxed by complete failure of the bearing. In recognition of this, many manufacturers of bearings are making one type of bearing for use on vertical shafts, and are making another type of bearing for use on horizontal shafts. This is quite objectionable since the use of two different bearings for the same type of device materially increases the cost of manufacture. The invention obviates the difficulties to which former bearings were subject by providing a bearing which may be prepared for efficient operation on vertical or horizontal shafts by a slight change in the position of the parts thereof. This result is secured by the employment of oil absorbent material in the bearing in conjunction with an oiler whose position may be changed to determine the oil level in the bearing. By proper determination of the oil level in the bearing, it is possible to use the bearing on vertical or horizontal shafts. It is, therefore, an object of the present invention to provide a bearing in which the oil level may be determined by a slight change in the position of the oiler used with the bearing.

Bearings have been made for many years which have oil absorbent material therein, but these bearings have not been completely satisfactory. In many of these bearings, fibers of the oil absorbent material were picked up by the rotating parts of the bearing assembly and found their way onto the bearing surfaces. There they were ground up and combined with the oil to form a sludge. Although the amount of sludge formed may be rather small, the presence of the sludge decreases the efficiency of the bearing. The invention obviates this difficulty by providing a closely woven oil absorbent material that is permitted to touch the rotating parts of the bearing at a limited number of points only. It is, therefore, an object of the present invention to provide a bearing that has oil absorbent material, the fibers of which will not be picked up by the rotating parts of the bearing.

Many of the bearings that use oil absorbent material have provided a positive circulation of oil through the bearing when the bearing was operated in a specified position. Positive lubrication of the bearing surfaces guarantees that an adequate supply of oil will be furnished to the bearing surfaces, and the provision of an adequate supply of oil reduces the frictional resistance to the rotation of the shafting and prolongs the life of the bearing. The fact that these bearings have an oiling system operative in one position only, however, seriously limits their utility. The invention, however, provides a bearing which has an oiling system operative in any position that provides a positive circulation of oil through the bearing. It is, therefore, an object of the present invention to provide a bearing with a positive system of lubrication that may be operated efficiently in the vertical or horizontal position.

Bearings that are installed on devices which have a seasonal operation, are subject to attack by the moisture which is carried into the bearing whenever changes in pressure occur. The effect of the moisture is quite serious where the bearing has ferrous material in it, and in some cases necessitates the installation of new bearings. This rusting is found in all types of bearings including those that use oil absorbent material therein, and is quite objectionable since it increases the frictional resistance of the bearing. The invention obviates the objection outlined above by providing a bearing with oil absorbent material in the chambers thereof that results in the permeation of the bearing by an oil vapor. The oil vapor in the chamber will tend to prevent the ingress and egress of air into and from the bearing and will effect a material reduction in the "breathing" of the bearing. It is, therefore, an object of the present invention to provide a bearing having oil absorbent material therein that is adapted to limit the "breathing" of the bearing.

Other objects and advantages of the invention will be shown and described in the drawings and accompanying description.

The drawings and accompanying description show and describe two forms of the invention, but it is to be understood that the drawings and accompanying description do not limit the invention, and that the invention will be defined by the accompanying claims.

In the drawings,

Fig. 2 is an end cross-sectional view of the same form of the invention as it is applied to a vertical shaft.

Fig. 3 is a side cross-sectional view of the bearing and shaft shown in end view in Fig. 2.

Fig. 4 is a perspective view of the oil absorbent material used in the bearing shown.

Figure 1:
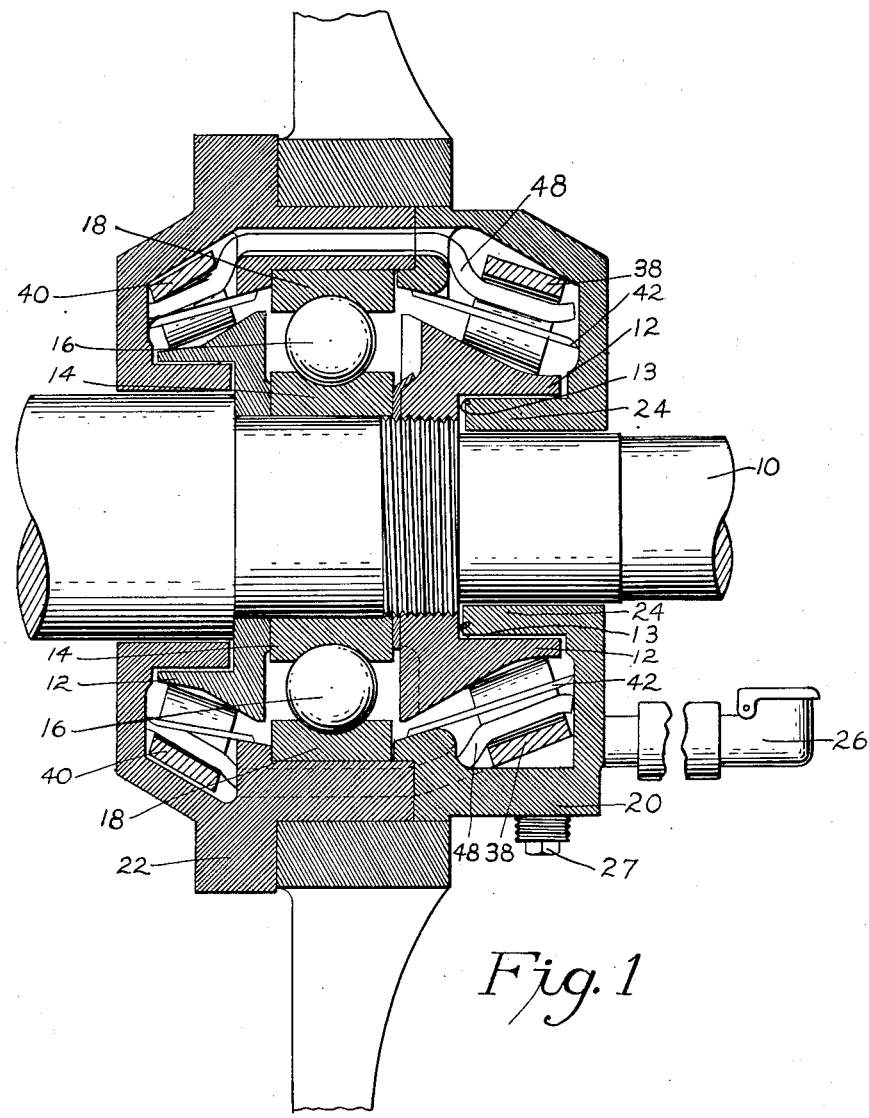
Fig. 1 is an elevational cross-sectional view of one form of the invention as it is applied to a horizontal shaft.
Figure 5:
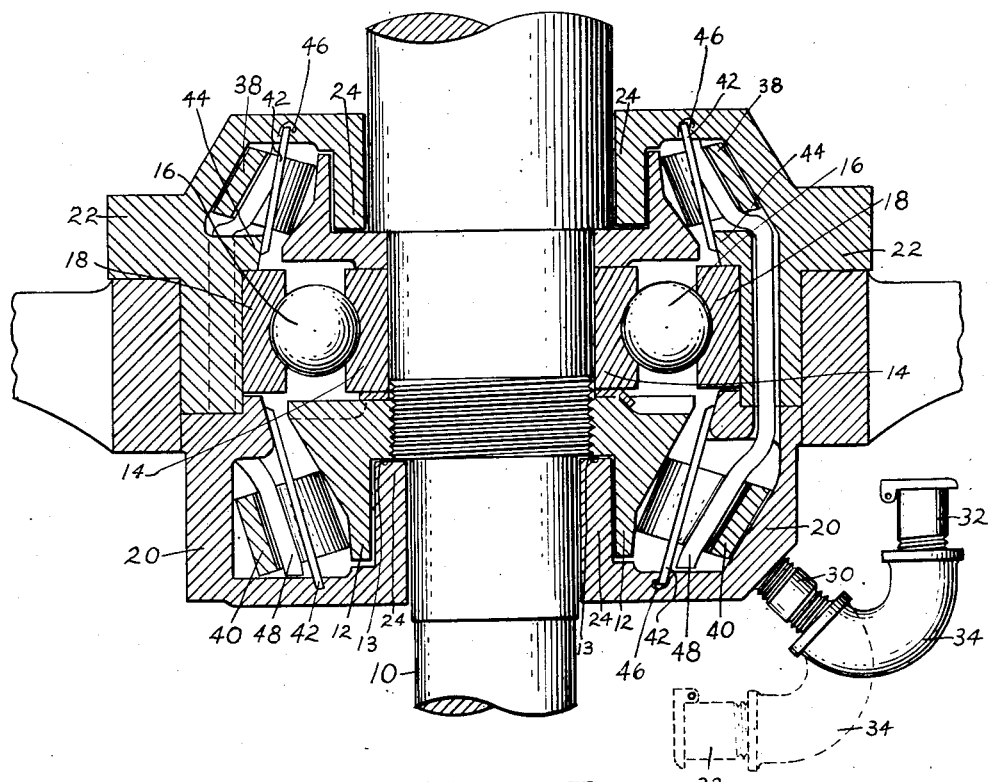
Fig. 5 is a side cross-sectional view of a preferred form of the invention.

Referring to the drawings in detail, a rotatable shaft is denoted by the numeral 10. Mounted on the shaft 10 and rotatable therewith are a pair of oil-throwing shoulders 12 and an inner race 14 of an anti-friction bearing. This inner race 14 is grooved to receive balls 16 which are received also by a groove in the outer race 18 of the anti-friction bearing. The outer race 18 of the anti-friction bearing is rigidly attached to the bearing frame. This frame consists of two cuplike members 20 and 22 which are formed to engage each other and form a bearing chamber therebetween. The engagement between the cuplike members 20 and 22 of the bearing frame is so intimate that a tight seal is formed between the two. This tight seal permits the maintenance of an oil supply in the lower portion of the bearing when it is used on a horizontal shaft as in Fig. 1. Each of the cuplike members 20 and 22 has a formed portion 24 therein which cooperates with the rotatable shaft 10 and the oil-throwing shoulders 12 on the shaft 10 to present a tortuous and lengthy path to any oil, air, or other substance attempting to enter or leave the bearing. The oil-throwing shoulders 12 are formed with recesses 13 in the inner periphery thereof, that have an inner diameter which is slightly larger than the outer diameter of the formed portions 12. Clearance is provided between the oil-throwing shoulders 12 and the formed portions 24 to permit the free rotation of the oil-throwing shoulders 12 relative to the formed portions 24, but the clearance is made small enough to resist the movement of any air, oil, or other substances between the shoulders 12 and the formed portions 24. The formed portions 24 in the cuplike members 20 and 22 of the frame are cylindrical in shape and serve as dams for oil in the bearing whenever the bearing is used on a vertical shaft as in Fig. 3. In such installations, oil may be maintained in the lower portions of the bearing at any level below the top of the lower formed portion 24. The oil level in the bearing is determined by the use of an oiler 26, the top of which is level with the desired oil level in the bearing. In one form of the invention, a number of holes are drilled and tapped in the bearing frame. These holes are designed to receive an oiler 26 and plugs 27, and permit the use of a standardized design of bearing on vertical or horizontal shafts. When the bearing is to be used on a horizontal shaft, all of the holes but one are plugged and an oiler is inserted in that one. Where the bearing is to be used on a vertical shaft, a different hole is opened for the oiler and the rest of the holes are plugged. The drawings show only two holes in the bearing frame, but eight are necessary to prepare the first form of the invention for operation in all positions on vertical or horizontal shafts. In the preferred form of the invention shown in Fig. 5, there is no necessity of having two holes in the bearing frame and of using a plug in one of them. This form of the invention provides an oiler that is permanently set in a hole in the frame and does not have to be removed whenever the position of the bearing is to be changed. This oiler is so designed that a rotation thereof permits the change of position of the bearing. This oiler has a threaded portion 30 which is set at an angle of 45° to the axis of the shaft 10, and has a capped portion 32 which is set at an angle of 45° to the threaded portion 30 of the oiler. The two portions 30 and 32 are connected together by a bend 34. The threaded portion 30 of the oiler is inserted in a tapped hole in the bearing frame. If the bearing is to be used on a vertical shaft, the oiler is rotated to the proper position, and if the bearing is to be used on a horizontal shaft, the oiler is rotated 180° around the axis of its threaded portion. The provision of this type of oiler permits efficient operation of the bearing regardless of the position of the bearing by the simple rotation of the oiler.

If desired, a bearing may be made which has one tapped hole therein to receive one of two oilers that might be sold with the bearing. One of these oilers would be like the oiler 26, and the other would be L-shaped. If the hole were positioned properly, one of the oilers could be used with the bearing whenever the bearing was to be mounted on a vertical shaft, and the other could be used whenever the bearing was to be mounted on a horizontal shaft. This arrangement would obviate the necessity of having two tapped holes in the frame and would obviate the necessity of changing the oiler and plug whenever the position of the bearing was to be altered.

The bearing is provided with annular strips 38 and 40 of closely woven felt that are positioned in the chambers of the cuplike members 20 and 22 of the bearing frame. The annular strips of felt are preferably positioned in the chambers of the cup-like members 20 and 22 before the members are assembled. These annular strips of felt 38 and 40 are maintained in position by metal plates 42 that are supported by a shoulder 44 and a recess 46 which are formed in the cuplike members 20 and 22 of the frame. The annular strips are bent to engage the plates of metal 42. Since the oil absorbent material is preferably closely woven, it will tend to straighten itself out. This tendency of the felt results in the holding of the plates 42 against the shoulders 44. The annular strips of felt 38 and 40 are so arranged that they contact the oil-throwing shoulders 12 at only a limited number of points, and the ends of the annular strips are maintained away from the oil-throwing shoulders. This avoids the picking up of any fibers of the oil absorbent material by the rotating parts of the bearing. In addition, this limits the amount of oil thrown onto the bearing surfaces. It has been found that where 5% to 25% of the area of said oil-throwing shoulders is contacted by the annular strips of felt, proper oiling is had. The annular strips of felt extend into the oil reservoir in the lower portions of the bearing and absorb and distribute the oil therein to the oil throwing shoulders 12. Cross strips of felt 48 engage the annular strips of felt 38 and 40 and maintain an equal amount of oil in each of the annular strips of felt. The cross strips 48 are preferably bent to engage the inner surface of the annular strips 38. The cross strips are preferably closely woven and tend to straighten out. This tendency maintains the cross strips 48 and the annular strips 38 in oil-transferring engagement. These cross strips cooperate with the annular strips in the bearing to provide a large surface for the oil contained therein, which fosters vaporization of the oil. The felt cross strips 48 are positioned in recesses that are formed in the bearing frame. The oil that is deposited on the oil-throwing shoulders 12 by the strips of felt 38 and 40 is thrown onto the bearing surfaces where it lubricates and oils the races and the balls. Throwing of the oil onto the bearing surfaces avoids the dependence on the "crawling" action of oil which is common in many bearings today. In many bearings, rotation of the shafting is so fast that the surface tension of the oil is not sufficient to hold oil to the shafting. In such installation, the oil is thrown from the shafting before it reaches the bearing surfaces. Bearings which rely on the "crawling" action of the oil to lubricate the bearing surfaces are, therefore, subject to serious limitations. The invention avoids these limitations by providing means to throw oil directly onto the bearing surfaces. The oil that is absorbed by the annular strips of felt 38 and 40 is deposited on the oil-throwing shoulders 12 and is moved by centrifugal force to the ends of the shoulders and thence onto the bearing surfaces. The provision of two oil-throwing shoulders that are oppositely disposed with relation to the bearing, makes certain that all portions of the bearing will be oiled without dependence on gravitational force. Some bearings depend on gravitational force to cause the oil to pass through the bearings, but the utility of such bearings is thereby limited. Other bearings have failed because the rapid rotation of the balls or rollers around the axis of the bearing has caused the balls and rollers to serve as a screen to the oil thrown by a slinger, but the invention provides an adequate supply of oil on all of the bearing surfaces regardless of the speed or position of the bearing. Any excess of oil will gravitate to the lower portions of the bearing and will there be absorbed by the oil absorbent felt strips. The ready absorption of the excess oil by the felt strips and the continual deposit of oil on the shoulders 12 by the felt strips provides a positive circulation of oil through the bearing. This positive circulation of oil insures the provision of an adequate supply of oil on the bearing surfaces, and filters the oil as it moves through the bearing.

The provision of the felt strips in the chambers of the bearing provides an oil pervaded atmosphere throughout the entire bearing. This atmosphere has oil vapor therein and is, therefore, heavier and more sluggish than air. Such an atmosphere resists the ready entrance of air into the chambers of the bearing. This is quite advantageous since it reduces the tendency of the bearing to "breathe." "Breathing" of a bearing can be quite serious where the device on which the bearing is installed is not operated for long periods of time, because the oil gravitates off of the bearing surfaces and leaves them bare. Whenever changes in pressure are accompanied by changes in humidity, moisture is carried into the chambers of the bearing and attacks the ferrous metals therein. This phenomena is avoided by the provision of the oil pervaded atmosphere and the lengthy and tortuous path that is presented to any air attempting to enter the bearing.

Whereas I have shown and described two forms of the invention in the drawings and accompanying description, it is obvious to those skilled in the art that various changes in form may be made without altering the effect or scope of the invention.

It can be seen from the above that, by use of the invention, a simple and efficient bearing may be had that will have a long and efficient life.

What I claim is:

1. An "anti-breathing" lubricated bearing construction comprising a bearing frame that consists of two cuplike members cooperating with each other to form a seal therebetween, an anti-friction bearing supported by the bearing frame, a shaft rotatably supported by the anti-friction bearing, a pair of oil-throwing shoulders mounted on the shaft and rotatable therewith, said oil-throwing shoulders being oppositely disposed with relation to the anti-friction bearing, a cylindrical portion formed on each of the cuplike members that extends toward the bearing and cooperates with the shaft and one of the oil-throwing shoulders thereon to present a lengthy and tortuous path to any substance attempting to enter the bearing, a pair of annular strips of closely-woven oil absorbent material positioned in the bearing frame and oppositely disposed relative to the anti-friction bearing and having portions thereof that touch the oil-throwing shoulders and thereby transfer oil thereto, and cross strips of closely-woven oil absorbent material that are positioned in recesses in the bearing frame and engage the annular strips of oil absorbent material.

2. An "anti-breathing" lubricated bearing construction comprising a bearing frame, an anti-friction bearing supported by the bearing frame, a shaft rotatably supported by the anti-friction bearing and having oil throwing shoulders thereon, a pair of annular strips of closely-woven oil absorbent material positioned in the bearing frame and oppositely disposed relative to the anti-friction bearing, each of the annular strips having a number of folds therein that touch the portions of the oil-throwing shoulders, plates that engage the annular strips of oil absorbent material and permit them to contact the oil-throwing shoulders at a limited number of points only, and cross strips of closely-woven oil absorbent material that are positioned in recesses in the bearing frame and engage the annular strips of oil absorbent material.

3. An "anti-breathing" lubricated bearing construction comprising a bearing frame that consists of two cuplike members cooperating with each other to form a seal therebetween, an anti-friction bearing supported by the bearing frame, a shaft rotatably supported by the anti-friction bearing, a pair of oil-throwing shoulders mounted on the shaft and rotatable therewith, said oil-throwing shoulders being oppositely disposed with relation to the anti-friction bearing, a pair of annular strips of closely woven oil absorbent material positioned in the bearing frame and oppositely disposed relative to the anti-friction bearing and having portions thereof that engage the oil-throwing shoulders and transfer oil thereto, and cross strips of closely woven oil absorbent material that are positioned in recesses in the bearing frame and engage the annular strips of oil absorbent material, said annular strips and said cross strips of oil-absorbent material being adapted to provide lubrication for the bearing regardless of the position of the bearing frame.

4. An "anti-breathing" bearing construction comprising a bearing frame, an anti-friction bearing supported by the bearing frame, a shaft rotatably supported by the anti-friction bearing, a pair of oil-throwing shoulders mounted on the shaft and rotatable therewith, said oil-throwing shoulders being oppositely disposed with relation to the anti-friction bearing, a pair of annular strips of closely woven oil absorbent material positioned in the bearing frame and oppositely disposed relative to the anti-friction bearing, said annular strips being arranged to engage the oil-throwing shoulders and transfer lubricant to the oil-throwing shoulders, and cross strips of closely woven oil absorbent material that are positioned in recesses in the bearing frame and engage the annular strips of oil absorbent material.

JAMES L. HAMILTON.